(12) United States Patent
Okajima

(10) Patent No.: US 12,155,030 B2
(45) Date of Patent: Nov. 26, 2024

(54) NONAQUEOUS ELECTROLYTE ENERGY STORAGE DEVICE AND METHOD FOR MANUFACTURING NONAQUEOUS ELECTROLYTE ENERGY STORAGE DEVICE

(71) Applicant: GS Yuasa International Ltd., Kyoto (JP)

(72) Inventor: Takashi Okajima, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 713 days.

(21) Appl. No.: 17/272,955

(22) PCT Filed: Sep. 5, 2019

(86) PCT No.: PCT/JP2019/034968
§ 371 (c)(1),
(2) Date: Mar. 3, 2021

(87) PCT Pub. No.: WO2020/050359
PCT Pub. Date: Mar. 12, 2020

(65) Prior Publication Data
US 2021/0328255 A1     Oct. 21, 2021

(30) Foreign Application Priority Data
Sep. 5, 2018   (JP) .................. 2018-166425

(51) Int. Cl.
*H01M 10/0525* (2010.01)
*H01M 4/02* (2006.01)
(Continued)

(52) U.S. Cl.
CPC ....... *H01M 10/0525* (2013.01); *H01M 4/364* (2013.01); *H01M 4/505* (2013.01);
(Continued)

(58) Field of Classification Search
CPC .. H01M 10/0525; H01M 4/364; H01M 4/505; H01M 2004/028; H01M 2300/002;
(Continued)

(56) References Cited

U.S. PATENT DOCUMENTS

2003/0211391 A1   11/2003   Cho et al.
2011/0136019 A1    6/2011   Amiruddin et al.
(Continued)

FOREIGN PATENT DOCUMENTS

EP    3248233        11/2017
EP    3396771 A1     10/2018
(Continued)

OTHER PUBLICATIONS

International Search Report (ISR) dated Nov. 12, 2019 filed in PCT/JP2019/34968.

*Primary Examiner* — Lisa S Park
(74) *Attorney, Agent, or Firm* — RANKIN, HILL & CLARK LLP

(57) ABSTRACT

One aspect of the present invention is a nonaqueous electrolyte energy storage device including a positive electrode containing manganese-containing positive active material particles in which aluminum is present at least on a surface, and a nonaqueous electrolyte containing a salt represented by the following formula (1). Another aspect of the present invention is a method of producing a nonaqueous electrolyte energy storage device, including producing a positive electrode containing manganese-containing positive active material particles in which aluminum is present at least on a surface, and providing a nonaqueous electrolyte containing a salt represented by the following formula (1):

(Continued)

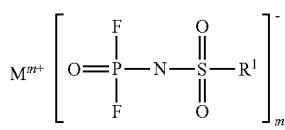

(1)

wherein $R^1$ is a hydrogen atom, a halogen atom, or an organic group, $M^{m+}$ is an alkali metal cation, an alkaline earth metal cation, or an onium cation. m is an integer equivalent to the number of valence of a cation represented by $M^{m+}$. when m is 2 or more, a plurality of $R^1$s are each independently as defined above.

6 Claims, 1 Drawing Sheet

(51) Int. Cl.
    *H01M 4/36*     (2006.01)
    *H01M 4/505*     (2010.01)
(52) U.S. Cl.
    CPC .............. *H01M 2004/028* (2013.01); *H01M 2300/002* (2013.01); *H01M 2300/0028* (2013.01)
(58) Field of Classification Search
    CPC ......... H01M 2300/0028; H01M 4/366; H01M 4/525; H01M 10/0568; H01G 11/50; H01G 11/30; H01G 11/46; H01G 11/62; Y02E 60/10; Y02P 70/50
See application file for complete search history.

(56) References Cited

U.S. PATENT DOCUMENTS

| | | | |
|---|---|---|---|
| 2015/0349327 A1* | 12/2015 | Hwang | H01M 4/133 429/231 |
| 2016/0336593 A1 | 11/2016 | Honda et al. | |
| 2017/0204124 A1* | 7/2017 | Takahashi | C07F 5/069 |
| 2018/0034045 A1 | 2/2018 | Xia et al. | |
| 2018/0358611 A1 | 12/2018 | Kimura et al. | |
| 2018/0375158 A1* | 12/2018 | Morinaka | H01G 11/64 |
| 2020/0328474 A1 | 10/2020 | Itabashi et al. | |
| 2021/0028493 A1 | 1/2021 | Morinaka et al. | |

FOREIGN PATENT DOCUMENTS

| | | |
|---|---|---|
| JP | 2003-331846 A | 11/2003 |
| JP | 2013-206688 A | 10/2013 |
| JP | 2016-154061 A | 8/2016 |
| JP | 5984014 B2 | 9/2016 |
| JP | 2017-107762 A | 6/2017 |
| JP | 2017-216040 A | 12/2017 |
| JP | 2018-508943 A | 3/2018 |
| WO | 2015/111189 A1 | 7/2015 |
| WO | 2016/002774 A1 | 1/2016 |
| WO | 2017/111143 A1 | 6/2017 |
| WO | WO2017111143 * | 6/2017 |
| WO | 2017/209895 A1 | 12/2017 |
| WO | 2018/003992 A1 | 1/2018 |

* cited by examiner

NONAQUEOUS ELECTROLYTE ENERGY STORAGE DEVICE AND METHOD FOR MANUFACTURING NONAQUEOUS ELECTROLYTE ENERGY STORAGE DEVICE

TECHNICAL FIELD

The present invention relates to a nonaqueous electrolyte energy storage device and a method of producing a nonaqueous electrolyte energy storage device.

BACKGROUND ART

Nonaqueous electrolyte secondary batteries typified by lithium ion secondary batteries are widely used for electronic devices such as personal computers and communication terminals, automobiles and the like because these secondary batteries have a high energy density. The nonaqueous electrolyte secondary battery generally has a pair of electrodes, electrically separated from each other with a separator, and a nonaqueous electrolyte interposed between the electrodes, and the secondary battery is configured to allow ions to be transferred between both the electrodes for charge-discharge. Capacitors such as a lithium ion capacitor and an electric double layer capacitor are also widely used as nonaqueous electrolyte energy storage devices other than the nonaqueous electrolyte secondary battery.

Patent Document 1 proposes a lithium ion secondary battery in which a surface of a positive active material is coated with a metal compound such as aluminum oxide. According to Patent Document 1, by coating the surface of the positive active material with a metal compound or the like, it is possible to obtain a high-capacity lithium ion secondary battery having good cycle durability even at high temperatures.

PRIOR ART DOCUMENT

Patent Document

Patent Document 1: JP-A-2013-206688

SUMMARY OF THE INVENTION

Problems to be Solved by the Invention

In the conventional nonaqueous electrolyte energy storage device as described above, there is room for improvement in terms of cycle performance. For example, considering use in a low temperature environment, a rate of increase of DC resistance (output resistance) at a low temperature after a charge-discharge cycle is preferably low. However, in Patent Document 1 above, the rate of increase of DC resistance has not been examined. Furthermore, in Patent Document 1, a change in discharge capacity is confirmed by a 30-cycle charge-discharge cycle test in Examples. However, the inventors have confirmed that as the number of cycles increases, the discharge capacity significantly decreases even when a positive active material whose surface is coated with a metal compound is used (see Comparative Example 1).

The present invention has been made in view of the above-described situations, and an object of the present invention is to provide a nonaqueous electrolyte energy storage device in which a rate of increase of DC resistance is low at low temperature after a charge-discharge cycle and a capacity retention ratio is high, and a method of producing such a nonaqueous electrolyte energy storage device.

Means for Solving the Problems

One aspect of the present invention made to solve the above problems is a nonaqueous electrolyte energy storage device including a positive electrode containing manganese-containing positive active material particles in which aluminum is present at least on a surface, and a nonaqueous electrolyte containing a salt represented by the following formula (1).

[CHEM. 1]

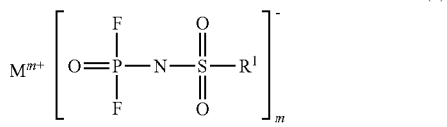

In the formula (1), $R^1$ is a hydrogen atom, a halogen atom, or an organic group. $M^{m+}$ is an alkali metal cation, an alkaline earth metal cation, or an onium cation. m is an integer equivalent to the number of valence of a cation represented by $M^{m+}$. When m is 2 or more, a plurality of $R^1$s are each independently as defined above.

Another aspect of the present invention is a method of producing a nonaqueous electrolyte energy storage device, including producing a positive electrode containing manganese-containing positive active material particles in which aluminum is present at least on a surface, and providing a nonaqueous electrolyte containing a salt represented by the following formula (1).

[CHEM. 2]

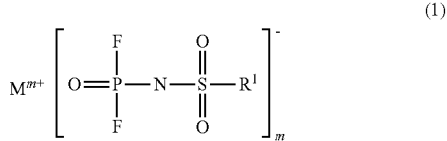

In the formula (1), $R^1$ is a hydrogen atom, a halogen atom, or an organic group. $M^{m+}$ is an alkali metal cation, an alkaline earth metal cation, or an onium cation. m is an integer equivalent to the number of valence of a cation represented by $M^{m+}$. When m is 2 or more, a plurality of $R^1$s are each independently as defined above.

Advantages of the Invention

The present invention can provide a nonaqueous electrolyte energy storage device in which a rate of increase of DC resistance is low at low temperature after a charge-discharge cycle and a capacity retention ratio is high, and a method of producing such a nonaqueous electrolyte energy storage device.

MODE FOR CARRYING OUT THE INVENTION

Figure 1:
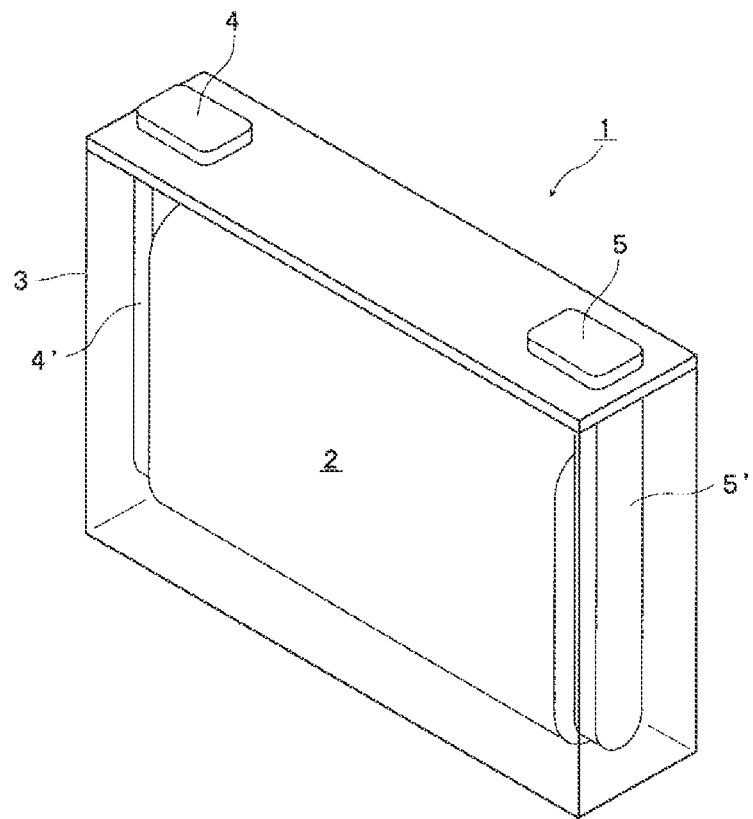
FIG. 1 is an external perspective view showing a nonaqueous electrolyte energy storage device according to an embodiment of the present invention.

A nonaqueous electrolyte energy storage device according to an embodiment of the present invention is a nonaqueous electrolyte energy storage device including a positive electrode containing manganese-containing positive active material particles in which aluminum is present at least on a surface, and a nonaqueous electrolyte containing a salt represented by the following formula (1).

[CHEM. 3]

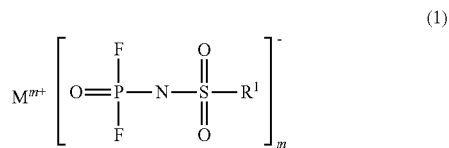

(1)

In the formula (1), $R^1$ is a hydrogen atom, a halogen atom, or an organic group. $M^{m+}$ is an alkali metal cation, an alkaline earth metal cation, or an onium cation. m is an integer equivalent to the number of valence of a cation represented by $M^{m+}$. When m is 2 or more, a plurality of $R^1$s are each independently as defined above.

In the nonaqueous electrolyte energy storage device, a rate of increase of DC resistance is low at low temperature after a charge-discharge cycle, and a capacity retention ratio is high. Although the reason why such an effect occurs is not clear, the following reasons are presumed. Conventionally, suppression of deterioration of a positive electrode has been studied as one of means for suppressing the increase of DC resistance at low temperature after the charge-discharge cycle of the nonaqueous electrolyte energy storage device and improving the capacity retention ratio. Causes of deterioration of the positive electrode include elution of transition metal from the positive active material, formation of a deteriorated layer on the surface of the active material, and oxidative decomposition of an electrolyte solution on the positive electrode. In particular, in a manganese-containing positive active material, deterioration due to elution of transition metal such as manganese from the positive active material is likely to occur remarkably. So far, it has been proposed to suppress the deterioration of the positive electrode by forming a protective film on the positive electrode with an electrolyte solution additive. However, in conventional nonaqueous electrolyte energy storage devices using a general nonaqueous electrolyte, as repetition of charging and discharging progresses, the protective film itself deteriorates, the effect of suppressing the deterioration of the positive electrode cannot be maintained. On the other hand, in the nonaqueous electrolyte energy storage device, aluminum is contained on the surface of the manganese-containing positive active material particles, a salt having a group having a specific structure is added, and aluminum present on the surface of the manganese-containing positive active material and the protective film formed by the salt having the group having the specific structure interact with each other to achieve stabilization and suppress deterioration of a film. Therefore, according to the nonaqueous electrolyte energy storage device, the effect of suppressing the deterioration of the positive electrode by the protective film formed by the salt having the group having the specific structure is maintained over a long-term charge-discharge cycle, so that it is presumed that the rate of increase of DC resistance is low at low temperature and the capacity retention ratio is high.

The content of the salt in the nonaqueous electrolyte is preferably 0.1% by mass or more and 5% by mass or less. When the content of the salt is in the above range, the rate of increase of DC resistance at low temperature after the charge-discharge cycle can be further lowered, and the capacity retention ratio can be further increased.

The positive active material particles preferably contain a positive active material containing nickel, cobalt and manganese, and the content of the nickel with respect to a total content of nickel, cobalt, and manganese of the positive active material is preferably 50 atm % or more. In a positive active material having a high nickel content, stability of a crystal structure is generally low as compared with a case where the nickel content is low, and a deterioration suppressing effect due to stabilization of the protective film can be more sufficiently obtained.

In the positive active material particles, an abundance of aluminum on the surface is preferably larger than the abundance of aluminum inside. By using such a positive active material, the rate of increase of DC resistance at low temperature after the charge-discharge cycle can be further lowered, and the capacity retention ratio can be further increased.

A method of producing a nonaqueous electrolyte energy storage device according to an embodiment of the present invention is a method of producing a nonaqueous electrolyte energy storage device, including producing a positive electrode containing positive active material particles in which aluminum is present at least on a surface, and providing a nonaqueous electrolyte containing a salt represented by the following formula (1).

[CHEM. 4]

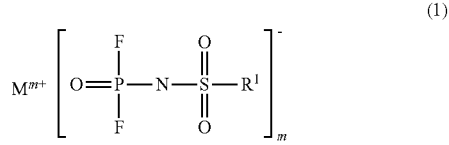

(1)

In the formula (1), $R^1$ is a hydrogen atom, a halogen atom, or an organic group. $M^{m+}$ is an alkali metal cation, an alkaline earth metal cation, or an onium cation. m is an integer equivalent to the number of valence of a cation represented by $M^{m+}$. When m is 2 or more, a plurality of $R^1$s are each independently as defined above.

According to the producing method, it is possible to produce a nonaqueous electrolyte energy storage device in which the rate of increase of DC resistance is low at low temperature after the charge-discharge cycle and the capacity retention ratio is high.

Hereinafter, the nonaqueous electrolyte energy storage device and the method of producing a nonaqueous electrolyte energy storage device according to an embodiment of the present invention will be described in detail.

<Nonaqueous Electrolyte Energy Storage Device>

The nonaqueous electrolyte energy storage device according to an embodiment of the present invention has a positive electrode, a negative electrode, and a nonaqueous electrolyte. Hereinafter, a nonaqueous electrolyte secondary battery will be described as an example of a nonaqueous electrolyte energy storage device. The positive electrode and the negative electrode usually form an electrode assembly alternately superposed by stacking or winding with a separator interposed therebetween. The electrode assembly is housed in a case, and the case is filled with the nonaqueous electrolyte. The nonaqueous electrolyte is interposed between the positive electrode and the negative electrode. As the case, a known metal case, a resin case or the like, which is usually used as a case of a nonaqueous electrolyte secondary battery, can be used.

(Positive Electrode)

The positive electrode has a positive substrate and a positive composite layer disposed directly or via an intermediate layer on the positive substrate.

The positive substrate has conductivity. As the material of the substrate, a metal such as aluminum, titanium, tantalum, or stainless steel, or an alloy thereof is used. Among these materials, aluminum and an aluminum alloy are preferable for the balance among the potential resistance, conductivity level, and cost. Exemplified as a form of the positive substrate are a foil and a deposited film, and a foil is preferable in terms of costs. That is, an aluminum foil is preferable as the positive substrate. Examples of aluminum and the aluminum alloy include A1085P and A3003P specified in JIS-H-4000 (2014).

The intermediate layer is a covering layer on the surface of the positive substrate, and reduces contact resistance between the positive substrate and the positive composite layer by including conductive particles such as carbon particles. The configuration of the intermediate layer is not particularly limited, and can be formed from, for example, a composition containing a resin binder (binding agent) and conductive particles. Having "conductivity" means having a volume resistivity of $10^7$ Ω·cm or less that is measured in accordance with JIS-H-0505 (1975), and the term "non-conductivity" means that the volume resistivity is more than $10^7$ Ω·cm.

The positive composite layer is a layer formed from a so-called positive composite containing positive active material particles. The positive composite layer contains optional components such as a conductive agent, a binder, a thickener and a filler as necessary.

The positive active material particles contain manganese. In the positive active material particles, aluminum is present at least on the surface of the positive active material particles. The positive active material particles include a particulate positive active material containing manganese and aluminum present on the surface of the positive active material.

As the positive active material, various manganese-containing materials conventionally used as the positive active material of a lithium ion secondary battery can be used without particular limitation. Preferable examples include composite oxides represented by $Li_xMeO_y$ (Me represents one or more transition metals containing at least Mn) ($Li_xNi_aCo_bMn_cM_dO_2$ and the like each having a layered α-NaFeO$_2$-type crystal structure, and $Li_xMn_2O_4$, $Li_xNi_\alpha Mn_{(2-\alpha)}O_4$ and the like each having a spinel-type crystal structure), and polyanion compounds represented by $Li_wMe_x(XO_y)_z$. (Me represents one or more transition metals containing at least Mn, and X represents, for example, P, Si, B, V or the like) ($LiMnPO_4$, $Li_2MnSiO_4$ and the like). Elements or polyanions in these positive active materials may be partially substituted with other elements or anionic species.

The positive active material preferably contains nickel, cobalt and manganese. At this time, the lower limit of the content of nickel with respect to the total content of nickel, cobalt and manganese may be, for example, 30 atm %, and is preferably 50 atm %. On the other hand, the upper limit of the content of the nickel is, for example, preferably 90 atm %, and more preferably 70 atm. The lower limit of the content of cobalt with respect to the total content of nickel, cobalt and manganese is preferably 5 atm %, and more preferably 10 atm. On the other hand, the upper limit of the content of the cobalt is preferably 40 atm %, and more preferably 30 atm %. The lower limit of the content of manganese with respect to the total content of nickel, cobalt and manganese is preferably 5 atm %, and more preferably 20 atm. On the other hand, the upper limit of the content of the manganese is preferably 40 atm %, and more preferably 30 atm %. By using the positive active material having such a composition, the deterioration suppressing effect due to stabilization of the protective film can be further enhanced, and an energy density can also be increased.

An example of a suitable positive active material is a lithium transition metal composite oxide having a layered crystal structure and at least Ni, Co, and Mn, and examples thereof include a lithium transition metal composite oxide (lithium-nickel-cobalt-manganese composite oxide) in which Li/Me that is a molar ratio of Li to the sum of Ni, Co, and Mn is 0≤Li/Me≤1.3, Ni/Me that is a molar ratio of Ni to the sum of Ni, Co, and Mn is 0.5≤Ni/Me<1, Co/Me that is a molar ratio of Co to the sum of Ni, Co, and Mn is 0<Co/Me<0.5, and Mn/Me that is a molar ratio of Mn to the sum of Ni, Co, and Mn is 0<Mn/Me<0.5.

In the above lithium transition metal composite oxide, Li/Me is preferably 1 or more, and may be 1. Ni/Me is preferably 0.9 or less, and more preferably 0.7. Co/Me is preferably 0.05 or more, and more preferably 0.1 or more. Furthermore, Co/Me is preferably 0.4 or less, and more preferably 0.3 or less. Mn/Me is preferably 0.05 or more, and more preferably 0.2 or more. Furthermore, Mn/Me is preferably 0.4 or less, and more preferably 0.3 or less.

Examples of the lithium transition metal composite oxide include $LiNi_{3/5}Co_{1/5}Mn_{1/5}O_2$, $LiNi_{1/2}Co_{1/5}Mn_{3/10}O_2$, $LiNi_{1/2}Co_{3/10}Mn_{1/5}O_2$, and $LiNi_{8/10}Co_{1/10}Mn_{1/10}O_2$. A chemical formula indicating the lithium transition metal composite oxide indicates a composition in a state before an initial charging treatment (that is, the charging treatment performed for the first time after battery components such as the positive electrode, the negative electrode, and the electrolyte are assembled).

The positive active material may be primary particles or secondary particles formed by aggregating primary particles. An average particle size of the primary particles of the positive active material is, for example, preferably 0.05 to 2 μm, and an average particle size of the secondary particles is, for example, preferably 5 to 30 μm. When the average particle size of the positive active material is the above lower limit or more, the production or handling of the positive active material becomes easy. When the average particle size of the positive active material is the above upper limit or less, electron conductivity of the positive composite layer is improved. Here, the "average particle size" is based on JIS-Z-8815 (2013), and means a value at which based on a particle size distribution measured by a laser diffraction/scattering method for a diluted solution obtained by diluting particles with a solvent, a volume-based integrated distribution calculated in accordance with JIS-Z-8819-2 (2001) is 50%.

The positive active material may be used singly, or two or more may be mixed and used. Especially, the positive active material preferably contains the above lithium transition metal composite oxide in a proportion of 50% by mass or more (typically 70 to 100% by mass, preferably 80 to 100% by mass) of all the positive active materials used, and it is more preferable to use a positive active material consisting substantially only of the above lithium metal composite oxide.

The aluminum is present at least on the surface of the particulate positive active material. For example, when the positive active material is a secondary particle, aluminum is present at least on the surface of the secondary particle. However, aluminum may be present between the primary particles of the positive active material. The aluminum does not have to be present so as to cover the entire surface of the particulate positive active material, and may be present on at least a portion of the surface of the positive active material. For example, aluminum may be present in a state of being dispersed in dots on the surface of the positive active material. Apart from the aluminum present on the surface of the positive active material, aluminum may be present in a portion other than the surface of the positive active material, that is, inside the positive active material.

The aluminum is usually present in the form of a compound on the surface of the positive active material. Examples of aluminum compounds include oxides, sulfides, halides, siliceous oxides, phosphorus oxides, sulfates, nitrate oxides, and alloys. Among these compounds, aluminum is preferably present as an oxide ($Al_2O_3$, $LiAlO_2$, etc.).

Examples of a method of allowing the aluminum to be present on the surface of the positive active material include a method of dissolving or suspending a compound containing an aluminum element in a solvent, impregnating and adding the solution or suspension into the positive active material, and then drying the positive active material, a method of dissolving or suspending a compound containing an aluminum element in a solvent, impregnating and adding the solution or suspension into the positive active material, and then causing a reaction by heating or the like, a method of adding a compound containing an aluminum element to a precursor of the positive active material and, at the same time, firing the mixture, and a method of mixing and firing a compound containing an aluminum element and the positive active material.

The aluminum present on the surface of the positive active material particles is usually present as particles such as aluminum oxide. The particle size of the aluminum oxide or the like may be, for example, 0.1 nm to 1 μm, preferably 1 nm to 100 nm.

The lower limit of the content of aluminum relative to the positive active material particles is, for example, preferably 0.01% by mass, more preferably 0.03% by mass, and still more preferably 0.05% by mass. When the content of aluminum is the above lower limit or more, the effect of suppressing deterioration of the protective film by aluminum can be further enhanced. On the other hand, the upper limit of the content of aluminum may be preferably 0.2% by mass, more preferably 0.15% by mass, and still more preferably 0.1% by mass. When the content of aluminum is the above upper limit or less, a ratio of the positive active material exposed increases, and insertion and desorption of ions are not inhibited, so that an increase in resistance can be suppressed. Since an amount of the positive active material is relatively large, the energy density and the like can be increased.

In the positive active material, the abundance of aluminum on the surface is preferably larger than the abundance of aluminum inside. For example, a ratio of a molar concentration of aluminum inside to the molar concentration of aluminum on the surface is preferably 10 mol % or less, more preferably 5 mol % or less, and still more preferably 1 mol % or less. The ratio of the molar concentration of aluminum inside to the molar concentration of aluminum on the surface can be determined by, for example, measuring a cross-sectional surface of the positive active material particles by using a SEM-EDX device, and calculating a ratio of the molar concentration of aluminum at the center of the particles and the molar concentration of aluminum on the surface of the particles. By using such a positive active material, the rate of increase of DC resistance at low temperature after the charge-discharge cycle can be further lowered, and the capacity retention ratio can be further increased.

Here, the content of aluminum relative to the positive active material particles is a value measured by ICP (radio frequency inductively coupled plasma) emission spectroscopy.

The lower limit of the content of the positive active material particles in the positive composite layer is preferably 50% by mass, more preferably 80% by mass, and still more preferably 90% by mass. The upper limit of the content of the positive active material particles is preferably 99% by mass, and more preferably 97% by mass.

The conductive agent is not particularly limited as long as it is a conductive material that does not adversely affect the energy storage device performance. Examples of such a conductive agent include carbon blacks such as natural or artificial graphite, furnace black, acetylene black, and ketjen black, metal, and conductive ceramic, and acetylene black is preferable. Examples of the shape of the conductive agent include a powdery shape and a fibrous shape.

Examples of the binder include thermoplastic resins such as fluororesins (polytetrafluoroethylene (PTFE), polyvinylidene fluoride (PVDF) and the like), polyethylene, polypropylene and polyimide; elastomers such as ethylene-propylene-diene rubber (EPDM), sulfonated EPDM, styrene-butadiene rubber (SBR) and fluorine rubber; and polysaccharide polymers.

Examples of the thickener include polysaccharide polymers such as carboxymethylcellulose (CMC) and methylcellulose. When the thickener has a functional group reactive with lithium, it is preferable to deactivate the functional group by methylation or the like in advance.

The filler is not particularly limited as long as it is a filler that does not adversely affect the battery performance. Examples of the main component of the filler include polyolefins such as polypropylene and polyethylene, silica, alumina, zeolite and glass.

The positive composite layer may also contain a typical nonmetal element such as B, N, P, F, Cl, Br, or I, a typical metal element such as Li, Na, Mg, K, Ca, Zn, Ga, or Ge, or a transition metal element such as Sc, Ti, V, Cr, Mn, Fe, Co, Ni, Cu, Mo, Zr, Nb, or W, as a component other than the positive active material, the conductive agent, the binding agent, the thickener, and the filler.

(Negative Electrode)

The negative electrode has a negative substrate and a negative composite layer disposed directly or via an intermediate layer on the negative substrate. The intermediate layer may have the same configuration as the intermediate layer of the positive electrode.

The negative substrate may have the same configuration as the positive substrate. However, as the material of the negative substrate, metals such as copper, nickel, stainless steel, and nickel-plated steel or alloys thereof are used, and copper or a copper alloy is preferable. Examples of the negative electrode substrate include a foil and a deposited film, and a foil is preferable in terms of costs. Therefore, a copper foil or a copper alloy foil is preferable as the negative electrode substrate. Examples of the copper foil include rolled copper foils and electrolytic copper foils.

The negative composite layer is formed from a so-called negative composite containing a negative active material. The negative composite that forms the negative composite layer contains optional components such as a conductive agent, a binder, a thickener and a filler as necessary. As regards the optional component such as a conducting agent, a binder, a thickener, or a filler, it is possible to use the same component as in the positive composite layer.

As the negative active material, a material capable of absorbing and releasing lithium ions is normally used. Specific examples of the negative active material include metals or metalloids such as Si and Sn; metal oxides or metalloid oxides such as an Si oxide, Ti oxide, and an Sn oxide; a polyphosphoric acid compound; and carbon materials such as graphite and non-graphitic carbon (easily graphitizable carbon or hardly graphitizable carbon). Among these materials, a carbon material is preferable, and graphite is more preferable. The term "graphite" refers to a carbon material in which an average lattice distance ($d_{002}$) of the (002) plane measured by an X-ray diffraction method before charging/discharging or in a discharged state is less than 0.34 nm. The "discharged state" here refers to that an open circuit voltage is 0.7 V or more in a unipolar battery using a negative electrode, containing a carbon material as a negative active material, as a working electrode and using metallic lithium as a counter electrode. That is, since a potential of the metal lithium counter electrode in an open circuit state is substantially equal to an oxidation-reduction potential of lithium, the open circuit voltage is substantially equal to a potential of the negative electrode containing the carbon material with respect to the oxidation-reduction potential of lithium, and the fact that the open circuit voltage is 0.7 V or more means that the potential of the negative electrode is 0.7 V (vs. Li/Li$^+$) or more and lithium ions that can be stored and released from the carbon material that is the negative active material by charging and discharging are sufficiently released.

The negative composite (negative composite layer) may also contain a typical nonmetal element such as B, N, P, F, Cl, Br, or I, a typical metal element such as Li, Na, Mg, Al, K, Ca, Zn, Ga, or Ge, or a transition metal element such as Sc, Ti, V, Cr, Mn, Fe, Co, Ni, Cu, Mo, Zr, Ta, Hf, Nb, or W.

(Separator)

As a material of the separator, for example, a woven fabric, a nonwoven fabric, a porous resin film or the like is used. Among them, a porous resin film is preferable from the viewpoint of strength, and a nonwoven fabric is preferable from the viewpoint of liquid retainability of the nonaqueous electrolyte. As a main component of the separator, a polyolefin such as polyethylene or polypropylene is preferable from the viewpoint of strength, and polyimide, aramid or the like is preferable from the viewpoint of resistance to oxidation and decomposition. These resins may be combined.

An inorganic layer may be disposed between the separator and the electrode (normally the positive electrode). The inorganic layer is a porous layer that is also called a heat-resistant layer or the like. It is also possible to use a separator with an inorganic layer formed on one surface of a porous resin film. The inorganic layer normally includes inorganic particles and a binder, and may contain other components. As the inorganic particles, $Al_2O_3$, $SiO_2$, aluminosilicate and the like are preferable.

(Nonaqueous Electrolyte)

The nonaqueous electrolyte contains a salt (hereinafter, also referred to as "salt (X)") represented by the following formula (1).

[CHEM. 5]

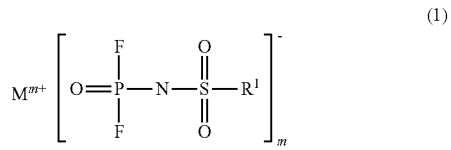

In the formula (1), $R^1$ is a hydrogen atom, a halogen atom, or an organic group. $M^{m+}$ is an alkali metal cation, an alkaline earth metal cation, or an onium cation. m is an integer equivalent to the number of valence of a cation represented by $M^{m+}$. When m is 2 or more, a plurality of $R^1$s are each independently as defined above.

Examples of the halogen atom represented by $R^1$ include fluorine, chlorine, and bromine.

The organic group represented by $R^1$ is a group containing a carbon atom. Examples of the organic group include a hydrocarbon group and other organic groups. Examples of the hydrocarbon group include an alkyl group such as a methyl group, an ethyl group and a propyl group, an alkenyl group such as an ethenyl group, an alkynyl group such as an ethynyl group, an aliphatic hydrocarbon group such as a cycloalkyl group such as a cyclohexyl group, and an aromatic hydrocarbon group such as a phenyl group, a benzyl group and a naphthyl group. Examples of other organic groups include groups in which one or more hydrogen atoms included in a hydrocarbon group are substituted with a group other than the hydrocarbon group, an alkoxy group, a carboxy group, and a cyano group. The carbon number of the organic group represented by $R^1$ is, for example, 1 to 20, and preferably 1 to 6.

As $R^1$, a halogen atom is preferable, and fluorine is more preferable.

Examples of the alkali metal cation represented by $M^{m+}$ include lithium ion and sodium ion. Examples of the alkaline earth metal cation include magnesium ions. Examples of the onium cation include ammonium ion.

As $M^{m+}$, the alkali metal cation is preferable, and the lithium ion is more preferable.

m is preferably 1 or 2, and more preferably 1.

The nonaqueous electrolyte usually further contains a nonaqueous solvent, and an electrolyte salt dissolved in the nonaqueous solvent. The salt (X) is usually present in a state of being dissolved in a nonaqueous solvent. In the nonaqueous electrolyte, the salt (X) may function as the electrolyte salt, and a salt other than the salt (X) may not be present as the electrolyte salt.

(Salt (X))

The salt (X) is not particularly limited as long as it is a salt represented by the above formula (1).

The lower limit of the content of the salt (X) in the nonaqueous electrolyte is preferably 0.1% by mass, more preferably 0.3% by mass, still more preferably 0.5% by mass, and even more preferably 1% by mass, 1.5% by mass or 2% by mass. When the content of the salt (X) is the above lower limit or more, the effect of suppressing deterioration of the protective film by aluminum on the surface of the manganese-containing positive active material particles is enhanced, the rate of increase of DC resistance at low temperature after the charge-discharge cycle can be further lowered, and the capacity retention ratio can be further increased. In particular, when the content of the salt (X) is increased, the rate of increase of DC resistance at low temperature after the charge-discharge cycle can be further lowered. On the other hand, the upper limit of the content of the salt (X) may be preferably 5% by mass, more preferably 4% by mass, still more preferably 3% by mass, and even more preferably 2% by mass or 1.2% by mass. When the content of the salt (X) is the above upper limit or less, occurrence of corrosion caused by the salt (X) is suppressed, and due to this suppression and the like, the rate of increase of DC resistance at low temperature after the charge-discharge cycle can be further lowered, and the capacity retention ratio can be further increased. In particular, when the content of the salt (X) is relatively reduced, the capacity retention ratio tends to increase.

(Nonaqueous Solvent)

As the nonaqueous solvent, a known nonaqueous solvent that is normally used as a nonaqueous solvent of a common nonaqueous electrolyte for an energy storage device can be used. Examples of the nonaqueous solvent include cyclic carbonate, linear carbonate, esters, ethers, amides, sulfone, lactones, and nitriles. Among these nonaqueous solvents, it is preferable to use at least cyclic carbonate or chain carbonate, and it is more preferable to use cyclic carbonate and chain carbonate in combination. By using the cyclic carbonate, dissociation of the electrolyte salt can be promoted and ionic conductivity of a nonaqueous electrolyte solution can be improved. By using the chain carbonate, a viscosity of the nonaqueous electrolyte solution can be kept low. When the cyclic carbonate and the chain carbonate are used in combination, a volume ratio of the cyclic carbonate and the chain carbonate (cyclic carbonate:chain carbonate) is, for example, preferably in a range from 5:95 to 50:50.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate and 1,2-diphenylvinylene carbonate, and among them, EC is preferable.

Examples of the chain carbonate include diethyl carbonate (DEC), dimethyl carbonate (DMC), ethyl methyl carbonate (EMC), diphenyl carbonate, trifluoroethyl methyl carbonate, and bis(trifluoroethyl) carbonate, and among them, EMC and DMC are preferable.

(Electrolyte Salt)

As the electrolyte salt, a known electrolyte salt that is normally used as an electrolyte salt of a common nonaqueous electrolyte for an energy storage device can be used. Examples of the electrolyte salt include lithium salts, sodium salts, potassium salts, magnesium salts and onium salts, with lithium salts being preferable.

Examples of the lithium salt include inorganic lithium salts such as $LiPF_6$, $LiBF_4$, $LiClO_4$, and $LiN(SO_2F)_2$, and lithium salts having a fluorinated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$. Among these salts, an inorganic lithium salt is preferable, and $LiPF_6$ is more preferable.

The lower limit of the content of the electrolyte salt in the nonaqueous electrolyte is preferably 0.1 $mol/dm^3$, more preferably 0.3 $mol/dm^3$, and still more preferably 0.5 $mol/dm^3$. On the other hand, the upper limit thereof is preferably 2.5 $mol/dm^3$, more preferably 2 $mol/dm^3$, and still more preferably 1.5 $mol/dm^3$. Regarding the content of this electrolyte salt, the salt (X) is not included in the electrolyte salt.

Other additives other than the salt (X), the nonaqueous solvent and the electrolyte salt may be added to the nonaqueous electrolyte. However, the upper limit of the content of the other additives in the nonaqueous electrolyte may be preferably 5% by mass, more preferably 1% by mass, and still more preferably 0.1% by mass.

The nonaqueous electrolyte preferably contains fluorophosphate as the other additive. By using the salt (X) in combination with fluorophosphate, the rate of increase of DC resistance at low temperature after the charge-discharge cycle can be further lowered.

The upper limit of the content of fluorophosphate in the nonaqueous electrolyte is more preferably 1.5% by mass, and still more preferably 1% by mass.

Examples of the fluorophosphate include difluorophosphates such as lithium difluorophosphate and sodium difluorophosphate. Among these, lithium difluorophosphate is preferable.

As the nonaqueous electrolyte described above, a salt that is melted at normal temperature, an ionic liquid, a polymer solid electrolyte, or the like can also be used.

The nonaqueous electrolyte secondary battery (energy storage device) has excellent charge-discharge cycle performance. Specifically, the rate of increase of DC resistance is low at low temperature after the charge-discharge cycle, and the capacity retention ratio is high. Thus, the nonaqueous electrolyte energy storage device can be used at a high operating voltage. For example, a positive electrode potential at an end-of-charge voltage of the nonaqueous electrolyte energy storage device during normal use can be 4.3 V (vs. $Li/Li^+$) or more, and can also be 4.35 V (vs. $Li/Li^+$) or more. On the other hand, the upper limit of the positive electrode potential at the end-of-charge voltage during normal use is, for example, 5 V (vs. Li/Li*), and may be 4.6 V (vs. Li/Li).

Here, the term "during normal usage" means use of the nonaqueous electrolyte energy storage device while employing charge conditions recommended or specified in the nonaqueous electrolyte energy storage device, and when a charger for the nonaqueous electrolyte energy storage device is prepared, this term means use of the nonaqueous electrolyte energy storage device by applying the charger. For example, in a nonaqueous electrolyte energy storage device using graphite as a negative active material, the positive electrode potential is about 4.3 V (vs. Li/Li) when the end-of-charge voltage is 4.2 V, although it depends on the design.

<Method of Producing Nonaqueous Electrolyte Energy Storage Device>

The energy storage device is preferably produced by the following method. That is, the method of producing a nonaqueous electrolyte energy storage device according to an embodiment of the present invention includes producing a positive electrode containing manganese-containing positive active material particles in which aluminum is present at least on a surface (positive electrode production step), and providing a salt (salt (X))-containing nonaqueous electrolyte represented by the above formula (1) (nonaqueous electrolyte provision step).

(Positive Electrode Production Step)

In the positive electrode production step, first, manganese-containing positive active material particles in which aluminum is present at least on the surface are produced. This method can be carried out, for example, by mixing a positive active material containing manganese with aluminum or an aluminum compound and firing the mixture. Examples of the aluminum compound include aluminum oxide, aluminum nitrate, aluminum sulfate, and aluminum chloride, and aluminum oxide ($Al_2O_3$) is preferable. According to the method of firing as described above, positive active material particles in which aluminum is present in the form of an oxide on the surface can be usually obtained. In addition, the positive active material particles in which aluminum is present at least on the surface can also be produced by the other methods described above.

A positive electrode is produced using a positive composite paste containing the positive active material particles thus obtained. The positive composite paste usually contains a binder and a dispersion medium in addition to the positive active material particles, and further contains other components if necessary. As the dispersion medium, an organic solvent is usually used. Examples of the organic solvent include polar solvents such as N-methyl-2-pyrrolidone (NMP), acetone and ethanol, and nonpolar solvents such as xylene, toluene and cyclohexane, the polar solvent is preferable, and NMP is more preferable. The positive composite paste can be obtained by mixing each of the above components. The positive composite paste is applied to the surface of the positive electrode substrate, and dried to obtain a positive electrode.

The method for applying the positive composite paste is not particularly limited, and the positive composite paste can be applied by a known method such as roller coating, screen coating or spin coating.

(Nonaqueous Electrolyte Provision Step)

The nonaqueous electrolyte provision step can be performed by mixing each component of the nonaqueous electrolyte. That is, for example, a nonaqueous electrolyte can be obtained by adding components such as the salt (X) and an electrolyte salt to a nonaqueous solvent and dissolving these components.

The producing method may include the following steps and the like in addition to the positive electrode production step and the nonaqueous electrolyte provision step. That is, the producing method can include, for example, a step of producing a negative electrode, a step of forming an electrode assembly in which a positive electrode and the negative electrode are alternately superposed by stacking or winding the positive electrode and the negative electrode with a separator interposed between the electrodes, a step of housing the positive electrode and the negative electrode (electrode assembly) in a container (case), a step of injecting a nonaqueous electrolyte into the container, and other steps. Usually, the electrode assembly is housed in the container, and then the nonaqueous electrolyte is injected into the container; however, the order may be reversed. A nonaqueous electrolyte secondary battery (nonaqueous electrolyte energy storage device) can be obtained by sealing an injection port after these steps.

Other Embodiments

The present invention is not limited to the aforementioned embodiments, and, in addition to the aforementioned embodiments, can be carried out in various modes with alterations and/or improvements being made. For example, it is not necessary to provide an intermediate layer in the positive electrode or the negative electrode. In the positive electrode of the nonaqueous electrolyte energy storage device, the positive composite and the negative composite are not required to form a distinct layer. For example, the positive electrode may have a structure in which a positive composite is carried on a mesh-shaped positive substrate.

In the above-described embodiment, an embodiment in which the nonaqueous electrolyte energy storage device is a nonaqueous electrolyte secondary battery has been mainly described, but the nonaqueous electrolyte energy storage device may be one other than a nonaqueous electrolyte secondary battery. Examples of another nonaqueous electrolyte energy storage device include capacitors (electric double layer capacitors and lithium ion capacitors).

FIG. 1 is a schematic view of a rectangular nonaqueous electrolyte energy storage device 1 (nonaqueous electrolyte secondary battery) as an embodiment of the nonaqueous electrolyte energy storage device according to the present invention. FIG. 1 is a view showing an inside of a case in a perspective manner. In the nonaqueous electrolyte energy storage device 1 shown in FIG. 1, an electrode assembly 2 is housed in a case 3. The electrode assembly 2 is formed by winding a positive electrode, including a positive composite, and a negative electrode, including a negative composite, with a separator interposed between the electrodes. The positive electrode is electrically connected to a positive electrode terminal 4 through a positive electrode lead 4', and the negative electrode is electrically connected to a negative electrode terminal 5 through a negative electrode lead 5'. A nonaqueous electrolyte is injected in the case 3.

Figure 2:
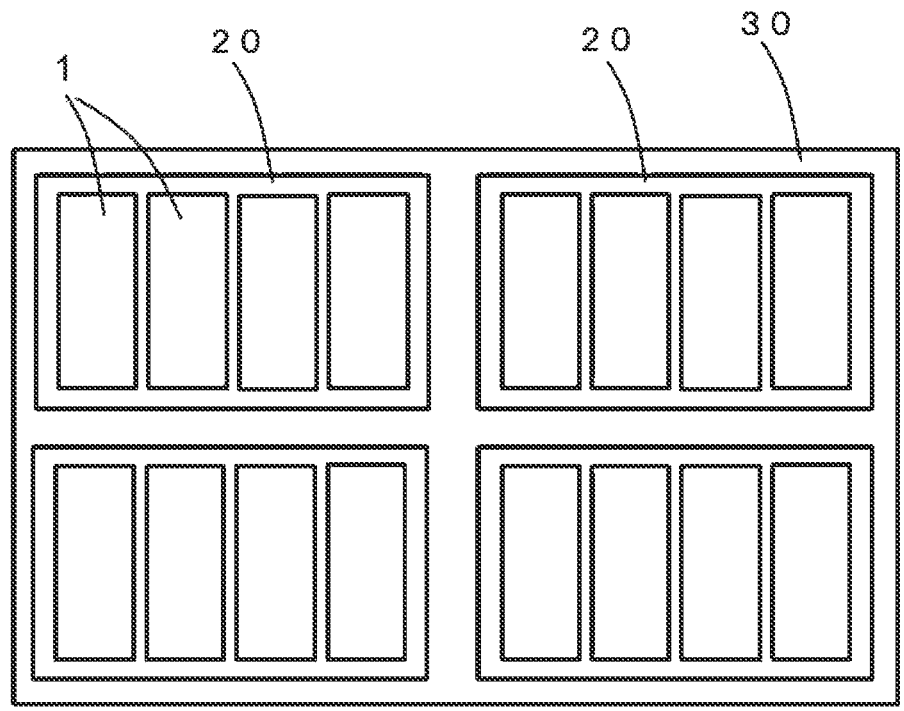
FIG. 2 is a schematic diagram showing an energy storage apparatus including a plurality of the nonaqueous electrolyte energy storage devices according to an embodiment of the present invention.

The configuration of the nonaqueous electrolyte energy storage device according to the present invention is not particularly limited, and examples include cylindrical batteries, prismatic batteries (rectangular batteries) and flat batteries. The present invention can also be implemented as an energy storage apparatus including a plurality of the nonaqueous electrolyte energy storage devices as described above. In this case, the technique of the present invention may be applied to at least one nonaqueous electrolyte energy storage device included in the energy storage apparatus. FIG. 2 shows an embodiment of an energy storage apparatus. In FIG. 2, an energy storage apparatus 30 includes a plurality of energy storage units 20. Each of the energy storage units 20 includes a plurality of the nonaqueous electrolyte energy storage devices 1. The energy storage apparatus 30 may include a bus bar (not shown) that electrically connects the two or more energy storage devices 1 and a bus bar (not shown) that electrically connects the two or more energy storage units 20. The energy storage unit 20 or the energy storage apparatus 30 may include a condition monitoring device (not shown) that monitors a state of one or more energy storage devices. The energy storage apparatus 30 can be mounted as a power source for an automobile such as an electric vehicle (EV), a hybrid vehicle (HEV), a plug-in hybrid vehicle (PHEV), or the like.

EXAMPLES

Hereinafter, the present invention will be described further in detail by way of examples, but the present invention is not limited to the following examples.

The compounds used as additives for the nonaqueous electrolyte in Examples and Comparative Examples are shown below. Salt a corresponds to salt (X).

Salt a: Compound represented by the following formula (a) (lithium (fluorosulfonyl) (difluorophosphonyl)imide)

Salt b: Compound represented by the following formula (b) (lithium difluorophosphate)

[CHEM. 6]

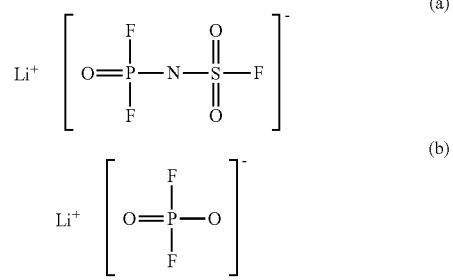

Production Example 1

Secondary particles of $LiNi_{1/2}Co_{1/5}Mn_{3/10}O_2$ (primary particle size of about 0.5 µm, secondary particle size of about 10 µm) as the produced positive active material of positive active material particles A in which aluminum was present on the surface and aluminum oxide ($Al_2O_3$) were mixed, and the mixture was then fired. As a result, the positive active material particles A in which aluminum oxide ($Al_2O_3$, $LiAlO_2$) having a particle size of 1 to 100 nm was present on the surface were obtained. The secondary particles of $LiNi_{1/2}Co_{1/5}Mn_{3/10}O_2$ in which no aluminum was present on the surface were designated as positive active material particles B. Secondary particles of $LiNi_{3/4}Co_{1/5}Al_{1/20}O_2$ (primary particle size of about 1.5 µm, secondary particle size of about 11 µm) were designated as positive active material particles C.

The content of aluminum contained in the positive active material was measured for the positive active material particles A and B by ICP emission spectroscopy. The content of aluminum in the positive active material particles A was 0.08% by mass. The content of aluminum in the positive active material particles B was 0% by mass.

Example 1

(Production of Positive Electrode)

The positive active material particles A were used as the positive active material particles, acetylene black was used as the conductive agent, and polyvinylidene fluoride was used as the binder. N-Methyl-pyrrolidone (NMP) was added in appropriate amounts to a mixture in which the ratios of the positive active material particles A, the conductive agent, and the binder were 93% by mass, 4% by mass, and 3% by mass, respectively, to adjust the viscosity, and thus to prepare a positive composite paste. The positive composite paste was intermittently applied to both sides of a 15 µm-thick aluminum foil except for an unapplied portion (region where no positive composite layer was formed), and dried to prepare a positive composite layer. Then, roll press was performed to produce a positive electrode. The thickness of the positive electrode was 135 µm.

(Production of Negative Electrode)

Graphite was used as the negative active material, styrene-butadiene rubber (SBR) was used as the binder, and carboxymethyl cellulose (CMC) was used as the thickener. Water was added in appropriate amounts to a mixture in which the negative active material, the binder, and the thickener were 96% by mass, 2% by mass, and 2% by mass, respectively, to adjust the viscosity, and thus to prepare a negative composite paste. The negative composite paste was intermittently applied to both sides of a 10 µm-thick copper foil except for an unapplied portion (region where no negative composite layer was formed), and dried to prepare a negative composite layer. Then, roll press was performed to produce a negative electrode. The thickness of the negative electrode was 148 µm.

(Preparation of Separator)

As a separator, a microporous membrane made of polyethylene having a thickness of 20 µm was used. Air permeability of the microporous membrane made of polyethylene was 210 sec/100 cc.

(Provision of Nonaqueous Electrolyte)

To a solvent prepared by mixing ethylene carbonate (EC) and ethyl methyl carbonate (EMC) so that EC was 30% by volume and EMC was 70% by volume, $LiPF_6$ was dissolved so that salt concentration was 1.0 mol/dm³. In addition, vinylene carbonate was added in a content of 0.5% by mass, and a salt (a) corresponding to the salt (X) represented by the above formula (1) was added as an additive in a content of 0.2% by mass, whereby a nonaqueous electrolyte was prepared.

(Production of Secondary Battery (Nonaqueous Electrolyte Energy Storage Device))

The positive electrode, the negative electrode, and the separator obtained in the above procedure were stacked and wound. Then, the region of the positive electrode where no positive composite layer was formed and the region of the negative electrode where no negative composite layer was formed were welded to the positive electrode lead and the negative electrode lead, respectively, and sealed in a container. After the container and a lid plate were welded, the nonaqueous electrolyte obtained above was injected and sealed. In this way, the secondary battery of Example 1 was produced.

Examples 2 to 6, Comparative Examples 1 to 7

Secondary batteries of Examples 2 to 6 and Comparative Examples 1 to 7 were obtained in the same manner as in Example 1 except that the types of positive active material particles used and the types and contents of additives for the nonaqueous electrolyte were as shown in Table 1. In the column of additives in the table, "-" indicates that the corresponding additive is not used.

[Evaluation]

Each of the obtained secondary batteries was evaluated by the following method.

(Measurement of Initial Discharge Capacity and Low-Temperature DC Resistance (DCR))

Each secondary battery was charged with a constant current at a constant voltage at 25° C. so that a charge current was 900 mA, a charging voltage was 4.25 V, and a charging time was 3 hours, and then discharged with a constant current so that a discharge current was 900 mA and a final voltage was 2.75 V, whereby the initial discharge capacity was measured. In addition, each secondary battery after an initial discharge capacity confirmation test was charged with a constant current at a low voltage so that the charge current was 900 mA, the charging voltage was 3.68 V, and the charging time was 3 hours, whereby a charging depth (SOC) of the battery was set to 50%. After 5 hours from cooling to −10° C., voltage (E1) at the time of discharge at 90 mA for 10 seconds, voltage (E2) at the time of discharge at 180 mA for 10 seconds, and voltage (E3) at the time of discharge at 270 mA for 10 seconds were measured. The DC resistance was calculated using these measured values (E1, E2, E3). Specifically, the measured values E1, E2, and E3 were plotted on a graph in which a horizontal axis was a current and a vertical axis was a voltage, these three points were approximated by a regression line (approximation line) based on a least square method, and a slope of the line was taken as a DC resistance (DCR) at a SOC of 50% at −10° C. This DCR was defined as an initial low temperature DCR.

(Charge-Discharge Cycle Test)

A cycle test in which each secondary battery was charged to 4.25 V with a charge current of 900 mA in a constant temperature bath at 45° C., further charged at a constant voltage of 4.25 V for a total of 3 hours, and then discharged with a constant current to 2.75 V with a discharge current of 900 mA was performed for 300 cycles. After cooling to 25° C., the discharge capacity after the charge-discharge cycle test was confirmed in the same manners as those for confirming the initial discharge capacity, and thereafter, the DC resistance after the charge-discharge cycle test was measured in the same manner as described above at −10° C. This DC resistance was defined as the low temperature DCR after the charge-discharge cycle test.

(Calculation of Rate of Increase of Low Temperature DCR)

The rate of increase of the low temperature DCR was calculated from the initial low temperature DCR and the low temperature DCR after the charge-discharge cycle test using the following mathematical formula (1).

Low temperature DCR increase rate (%)={(Low temperature DCR [Ω] after charge-discharge cycle test/Initial low temperature DCR [Ω]−1}× 100     (1)

(Calculation of Capacity Retention Ratio)

The capacity retention ratio was calculated from the initial discharge capacity and the discharge capacity after the charge-discharge cycle test using the following mathematical formula (2).

Capacity retention ratio (%)=(Discharge capacity after charge-discharge cycle test [mAh]/Initial discharge capacity [mAh])×100     (2)

Table 1 shows the measured initial low temperature DCR, and the low temperature DCR increase rate and capacity retention ratio after the charge-discharge cycle test.

TABLE 1

| | Positive active material particle | | Additive | | Initial stage Low temperature DCR mΩ | 45° C. after 300 cycles | |
|---|---|---|---|---|---|---|---|
| | Type | Al content mass % | Salt (a) mass % | Salt (b) mass % | | Low temperature DCR increase rate % | Capacity retention ratio % |
| Comparative Example 1 | A | 0.08 | — | — | 304 | 154 | 56 |
| Comparative Example 2 | B | 0 | 0.5 | — | 300 | 180 | 85 |
| Comparative Example 3 | B | 0 | — | 0.5 | 286 | 153 | 87 |
| Comparative Example 4 | B | 0 | 1.5 | 0.5 | 258 | 2 | 86 |
| Comparative Example 5 | A | 0.08 | — | 0.5 | 280 | 46 | 93 |
| Comparative Example 6 | C | — | — | — | 322 | 56 | 73 |
| Comparative Example 7 | C | — | 1.0 | — | 317 | 49 | 74 |
| Example 1 | A | 0.08 | 0.2 | — | 295 | 40 | 95 |
| Example 2 | A | 0.08 | 0.5 | — | 280 | 20 | 96 |
| Example 3 | A | 0.08 | 1.0 | — | 276 | 11 | 97 |
| Example 4 | A | 0.08 | 1.5 | — | 266 | −8 | 96 |
| Example 5 | A | 0.08 | 2.0 | — | 264 | −12 | 96 |
| Example 6 | A | 0.08 | 1.5 | 0.5 | 263 | −16 | 95 |

As shown in Table 1 above, in Comparative Examples 1, 3, 5, and 6 in which the salt (a) was not added, Comparative Examples 2 to 4 using the manganese-containing positive active material particles B in which no aluminum was present on the surface, and Comparative Examples 6 and 7 using the positive active material particles C which contained no manganese and in which aluminum was present on the surface, all the capacity retention ratios were as low as less than 95%, and in Comparative Examples 1 to 3, and 5 to 7, the low temperature DCR increase rate was as high as over 45%. In Comparative Example 4, although the low temperature DCR increase rate is low, the capacity retention ratio is low, and it is shown that a decrease in low temperature DCR increase rate and an increase in capacity retention ratio do not always have the same tendency.

On the other hand, in the nonaqueous electrolyte energy storage devices of Examples 1 to 6 using the manganese-containing positive active material A in which aluminum is present on the surface and the salt (a), the low temperature DCR increase rate is as low as 45% or less, and the capacity retention ratio is as high as 95% or more It can be said that achievement of both suppression of the low temperature DCR increase rate and improvement of the capacity retention ratio is an effect that occurs only when the manganese-containing positive active material in which aluminum is present on the surface and the salt (a) are used together.

In addition, the following can be confirmed from the comparison between the examples. From the comparison of Examples 1 to 5, it can be seen that by increasing the content of the salt (a), the initial low temperature DCR and the low temperature DCR after the charge-discharge cycle are further reduced. From the comparison between Example 5 and Example 6 using the same amount of additives as the total amount, it can be seen that if the salt (a) and the salt (b) are used together, the low temperature DCR increase rate further decreases.

INDUSTRIAL APPLICABILITY

The present invention can be applied to nonaqueous electrolyte energy storage devices to be used as power sources for electronic devices such as personal computers and communication terminals, power supplies for electric power storage use, automobiles and the like.

DESCRIPTION OF REFERENCE SIGNS

1: Nonaqueous electrolyte energy storage device
2: Electrode assembly
3: Case
4: Positive electrode terminal
4': Positive electrode lead
5: Negative electrode terminal
5': Negative electrode lead
20: Energy storage unit
30: Energy storage apparatus

The invention claimed is:

1. A nonaqueous electrolyte energy storage device comprising: a positive electrode containing positive active material particles including: a particulate positive active material containing manganese; and aluminum present on a surface of the positive active material; and a nonaqueous electrolyte containing an electrolyte salt consisting essentially of: a salt represented by the following formula (1):

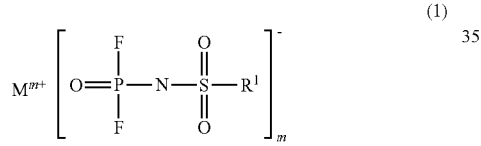

(1)

wherein $R^1$ is a hydrogen atom, a halogen atom, or an organic group, $M^{m+}$ is an alkali metal cation, an alkaline earth metal cation, or an onium cation, m is an integer equivalent to the number of valence of a cation represented by $M^{m+}$, when m is 2 or more, a plurality of $R^1$s are each independently as defined above;
optionally a salt represented by the following formula (b):

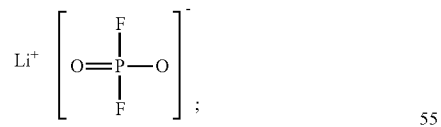

(b)

and
optionally one or more selected from a group consisting of $LiPF_6$, $LiBF_4$, $LiClO_4$, $LiN(SO_2F)_2$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F)_3$, wherein no salt other than the electrolyte salt is present in the nonaqueous electrolyte.

2. The nonaqueous electrolyte energy storage device according to claim 1, wherein the electrolyte salt consists of: the salt represented by the formula (1);
optionally the salt represented by the formula (b); and
optionally one or more selected from a group consisting of $LiPF_6$, $LiBF_4$, $LiClO_4$, $LiN(SO_2F)_2$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$.

3. The nonaqueous electrolyte energy storage device according to claim 1, wherein a content of the salt represented by the formula (1) is 0.5% by mass or more and 2.0% by mass or less.

4. The nonaqueous electrolyte energy storage device according to claim 1, wherein the aluminum present on the surface of the positive active material is present as particles of aluminum oxide, and a particle size of the aluminum oxide is 1 nm or more and 100 nm or less.

5. The nonaqueous electrolyte energy storage device according to claim 1, wherein a content of the aluminum present on the surface of the positive active material relative to the positive active material particles is 0.01% by mass or more and 0.2% by mass or less.

6. A method of producing a nonaqueous electrolyte energy storage device comprising: producing a positive electrode containing positive active material particles including: a particulate positive active material containing manganese; and aluminum present on a surface of the positive active material; and a nonaqueous electrolyte containing an electrolyte salt consisting essentially of: a salt represented by the following formula (1):

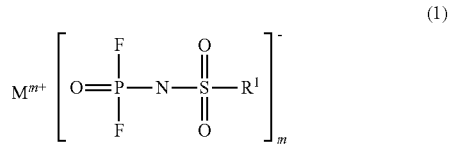

(1)

wherein $R^1$ is a hydrogen atom, a halogen atom, or an organic group, $M^{m+}$ is an alkali metal cation, an alkaline earth metal cation, or an onium cation, m is an integer equivalent to the number of valence of a cation represented by $M^{m+}$, when m is 2 or more, a plurality of $R^1$s are each independently as defined above;
optionally a salt represented by the following formula (b):

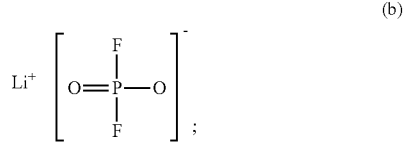

(b)

and
optionally one or more selected from a group consisting of $LiPF_6$, $LiBF_4$, $LiClO_4$, $LiN(SO_2F)_2$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F)_3$, wherein no salt other than the electrolyte salt is present in the nonaqueous electrolyte.

* * * * *